(12) United States Patent
Larsson

(10) Patent No.: US 9,534,706 B2
(45) Date of Patent: Jan. 3, 2017

(54) SUBSEA SYSTEM FOR MOUNTING A CABLE TO A PIPELINE

(71) Applicant: NEXANS, Paris (FR)

(72) Inventor: Roger Larsson, Stromstad (SE)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/178,817

(22) Filed: Feb. 12, 2014

(65) Prior Publication Data

US 2016/0018023 A1 Jan. 21, 2016

(30) Foreign Application Priority Data

Mar. 13, 2013 (NO) .................................. 20130369

(51) Int. Cl.
| | |
|---|---|
| *F16L 3/20* | (2006.01) |
| *E21B 17/10* | (2006.01) |
| *F16L 3/08* | (2006.01) |
| *F16L 3/10* | (2006.01) |
| *F16L 3/24* | (2006.01) |
| *F16L 9/19* | (2006.01) |
| *F16L 1/24* | (2006.01) |
| *F16L 3/237* | (2006.01) |
| *F16L 1/20* | (2006.01) |
| *H02G 3/32* | (2006.01) |
| *H02G 1/10* | (2006.01) |
| *H02G 9/02* | (2006.01) |

(52) U.S. Cl.
CPC .. *F16L 3/08* (2013.01); *F16L 1/20* (2013.01); *F16L 1/24* (2013.01); *F16L 3/1075* (2013.01); *F16L 3/237* (2013.01); *F16L 3/24* (2013.01); *F16L 9/20* (2013.01); *F16L 2201/00* (2013.01); *H02G 1/10* (2013.01); *H02G 3/32* (2013.01); *H02G 9/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,249,610 A | * | 2/1981 | Loland | E21B 17/012 166/352 |
| 5,875,155 A | * | 2/1999 | Sofue | G11B 7/08517 369/13.32 |
| 6,431,502 B1 | * | 8/2002 | Goodman | E21B 17/1035 248/229.14 |
| 7,861,982 B1 | * | 1/2011 | McClure | F16L 3/1075 248/229.14 |
| 9,074,426 B1 | * | 7/2015 | West | E21B 17/01 |
| 2008/0283687 A1 | * | 11/2008 | McClure | E21B 17/1035 248/74.1 |

(Continued)

FOREIGN PATENT DOCUMENTS

WO WO03074916 9/2003

*Primary Examiner* — Benjamin Fiorello
*Assistant Examiner* — Kyle Armstrong
(74) *Attorney, Agent, or Firm* — Sofer & Haroun, LLP

(57) ABSTRACT

A subsea system I provided for mounting a cable to a pipeline (1), having a holding means (2) for holding the cable, where the system further comprises a track (3) around at least parts of the circumference of the pipeline (1). The holding means (2) has a sledge element (4), and the track (3) and the sledge element are slidably connected such that the sledge element may move along said track.

10 Claims, 3 Drawing Sheets

(56) References Cited

U.S. PATENT DOCUMENTS

| | | | |
|---|---|---|---|
| 2011/0186693 A1* | 8/2011 | McMiles | F16L 3/08 248/65 |
| 2012/0217354 A1* | 8/2012 | Walraven | H02G 3/32 248/74.1 |
| 2014/0116559 A1* | 5/2014 | Zhang | F16L 1/123 138/106 |

* cited by examiner

SUBSEA SYSTEM FOR MOUNTING A CABLE TO A PIPELINE

RELATED APPLICATION

This application claims the benefit of priority from Norwegian Patent Application No. 2013 0369, filed on Mar. 13, 2013, the entirety of which is incorporated by reference.

TECHNICAL FIELD

The present invention concerns a system and a method for mounting cables to subsea pipelines.

BACKGROUND

In many subsea applications it is necessary, or advantageous, to secure or mount a cable or pipe to a larger pipeline. This is commonly achieved by simply strapping the smaller cable or pipe to the larger pipeline by using for instance an Inconel strap, optionally using a saddle between the cable and the pipeline.

There are several disadvantages with the prior art techniques for securing cables to pipelines. Some of the most notable disadvantages are the fact that the cable may not be reoriented after installation, the straps may loosen due to the hydrostatic pressure, the cable can be exposed to compression forces, and the overlength can be accumulated to some areas and not evenly spread along the pipeline. Further, the cable often requires additional protection to avoid being damaged by external impacts from, for instance, a trawl board.

WO 03/074916 A1 discloses a piggy back clamp for securing a relatively small pipe or conduit to a larger pipe or conduit. The clamp is shaped to sit on the circumference of the larger pipe, and is typically secured in position by means of a securing strap.

Based on the prior art there is a need for a system for connecting cables to subsea pipelines which avoids or alleviates at least some of the known disadvantages.

SUMMARY OF THE INVENTION

The present invention provides a system for securing or mounting a cable to a larger pipeline, which avoids at least some of the prior art disadvantages. In the system according to the invention, the cable is connected to the larger pipeline such that the cable is movable along the circumference of said pipeline. The invention is further defined by the appended claims and in the following:

The present invention provides a subsea system for mounting a cable to a pipeline, comprising holding means for holding the cable, wherein the system further comprises a track around at least parts of the circumference of the pipeline, and the holding means comprises a sledge element, and the track and the sledge element are slidably connected such that the sledge element may move along said track.

In one embodiment of the system according to the invention, the connection between the track and the sledge element prevents said sledge element from moving in a radial direction in relation to the pipeline when in use.

In a further embodiment of the system according to the invention, the connection between the track and the sledge element comprises at least one recess and at least one cooperating rib.

In a further embodiment of the system according to the invention, the holding means comprises a clamp. In some embodiments of the invention, at least parts of the clamp are pivotably connected to the sledge element.

In a further embodiment of the system according to the invention, the holding means, or the cable, comprises buoyant elements, such that the cable will be positioned at the topside of the pipeline when in use.

In a further embodiment of the system according to the invention, the connection between the sledge element and the track comprises means for securing the sledge element at a specific position along said track.

In a further embodiment of the system according to the invention, the sledge element is secured to the track by a belt being arrangeable around the pipeline.

In a further embodiment of the system according to the invention, the track is an integrated part of the pipeline.

In a further embodiment of the system according to the invention, the track is a discrete track element. The track element is arrangeable around the circumference of a pipeline.

The present invention also provides a cable holding device for a system according to the invention, comprising holding means for holding the cable and a track element arrangeable along the circumference of a pipeline, wherein the holding means comprises a sledge element, and the track element and the sledge element are slidably connectable such that the sledge element may move along said track element.

The present invention also provides a method for mounting a cable to a pipeline, comprising the steps of:
arranging a track element around the circumference of the pipeline, or providing a pipeline having a track integrated around the circumference of the pipeline
fastening the cable to holding means comprising a sledge element; and -slidably connecting the sledge element to the track element, such that the sledge element may move along said track element.

As used in the present description, the term cable may include any type of longitudinal conduit for signals, electric current or fluid medium. The cable is preferably flexible, but rigid cables may also be used. In order for the system according to the invention to function optimally, the cable must have a smaller diameter than the pipeline to which it is mounted.

As used in the present description, the term holding means may include any type of element capable of being securely fastened to a cable. Such means may include for instance any type of clamp or strapping device combinable with a sledge element.

As used in the present description, a "sledge element" or "sledge" may include any type of element capable of being connected to a track element, such that movement of the sledge element in at least one direction being perpendicular to the longitudinal axis of said track element is restricted.

As used in the present description, a "track" is intended to define a substantially longitudinal groove or rail arranged at least partly around a pipeline. The transverse cross-section of the track is such that a sledge element may be slidably connected to it, such that the sledge element is prevented from moving in the longitudinal direction of the pipeline. Preferably, the cross-section is such that the sledge element is prevented from being disconnected from said track by at least one cooperating rib and recess. The rib arranged on, or in, said track and the recess on said sledge element, or vice versa. Optionally the cross-section of the track is such that the sledge element is prevented from being disconnected from the track by use of a belt or strap extendable around the pipeline.

As used in the present description, a "track element" is intended to define a discrete, and substantially longitudinal, profile or rail able to be arranged at least partly around a pipeline for providing a track. The cross-section of the track element is such that a sledge element may be slidably connected to it, such that the sledge element is prevented from moving in the longitudinal direction of the pipeline. Preferably, the cross-section is such that the sledge element is prevented from being disconnected from said track element by at least one cooperating rib and recess. The rib arranged on said track element and the recess on said sledge element, or vice versa. Optionally the cross-section of the track element is such that the sledge element is prevented from being disconnected from the track element by use of a belt or strap extendable around the pipeline.

The holding means, sledge element, and track element may be produced in any material suitable for the intended use. The sledge element and holding means may, for instance, advantageously be made in a moldable plastic, while the track element may advantageously be made in an extrudable plastic.

DETAILED DESCRIPTION OF THE INVENTION

Two embodiments of the present invention are described in the following by reference to the appended drawings.

Figure 1:
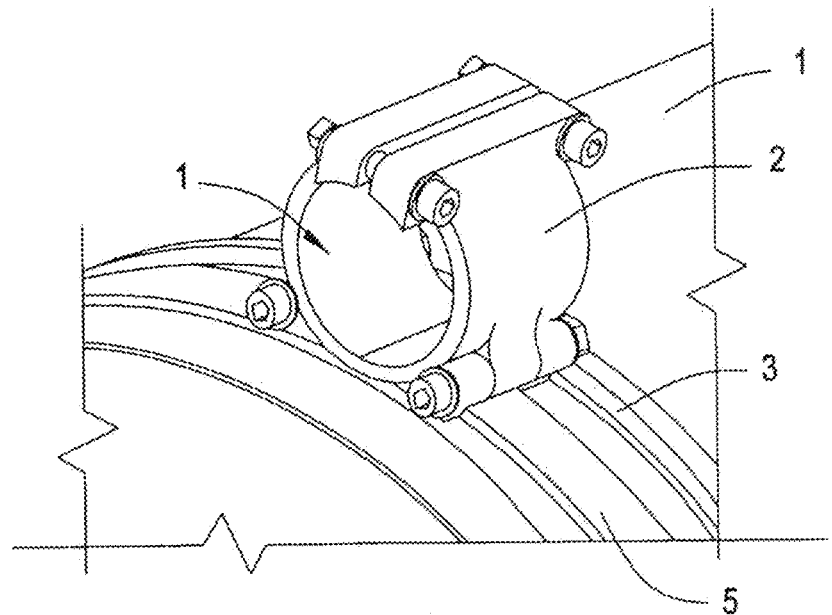
FIG. 1 is a perspective view of an embodiment of the system according to the invention.
Figure 2:
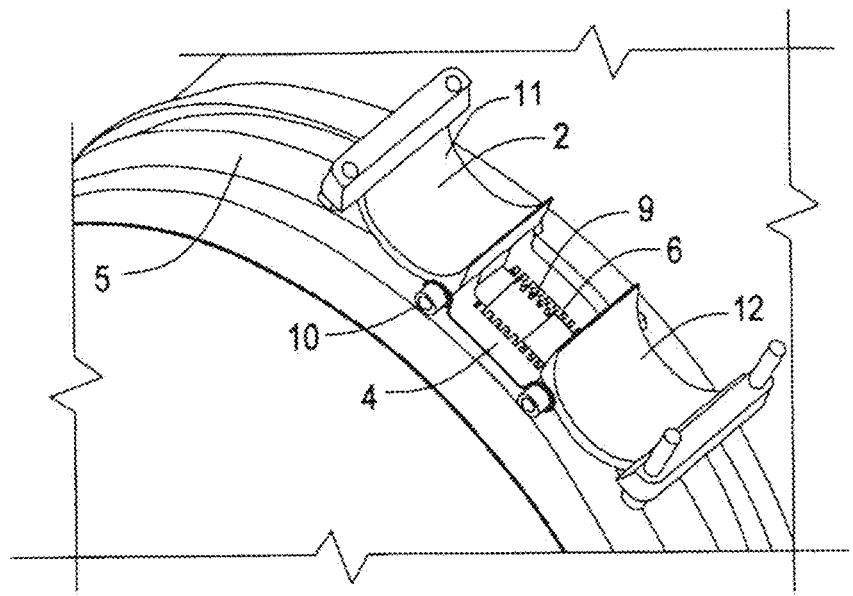
FIG. 2 is a perspective view of the system in FIG. 1, wherein the clamp is open.
Figure 3:
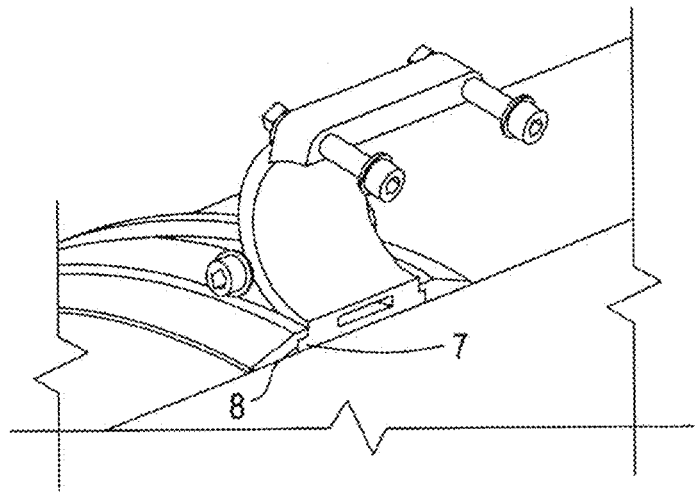
FIG. 3 is a cross-sectional view of the embodiment in FIGS. 1 and 2.

A first embodiment of a system for mounting a cable to a pipeline 1 is depicted in FIG. 1. The system comprises a holding means 2 for holding the cable. An inner circumference I of the holding means is adapted to accommodate the cable. In this particular embodiment, the holding means is a clamp 2 made up of two clamp halves 11, 12, see FIG. 2. Each of the clamp halves are pivotably connected 10 to a sledge 4. The sledge is arranged on a track element 3 in close contact with, and encircling, the pipeline. An adjustable belt 5 is connected to the sledge. In each end, the belt is connected to the sledge by use of pins 6. The pins are positioned in notches 9 situated in the sledge. The belt may be adjusted by varying which set of notches 9 the pins 6 are positioned in. In this particular embodiment, see FIG. 3, the sledge and the track element have cooperating ribs 7 and recesses 8 which hold the sledge in place while allowing it to move along the track element around the pipeline. The belt 5 will in this embodiment act as a redundancy strapping making sure the sledge is held in place even if the rib/recess, keeping the sledge from moving in a radial direction in relation to the pipeline, should fail. In other embodiments of the invention, the connection between the sledge and track element will only prevent the sledge from moving in the axial direction of the pipeline, and the belt is required to keep the sledge from moving in a radial direction in relation to said pipeline.

Figure 4:
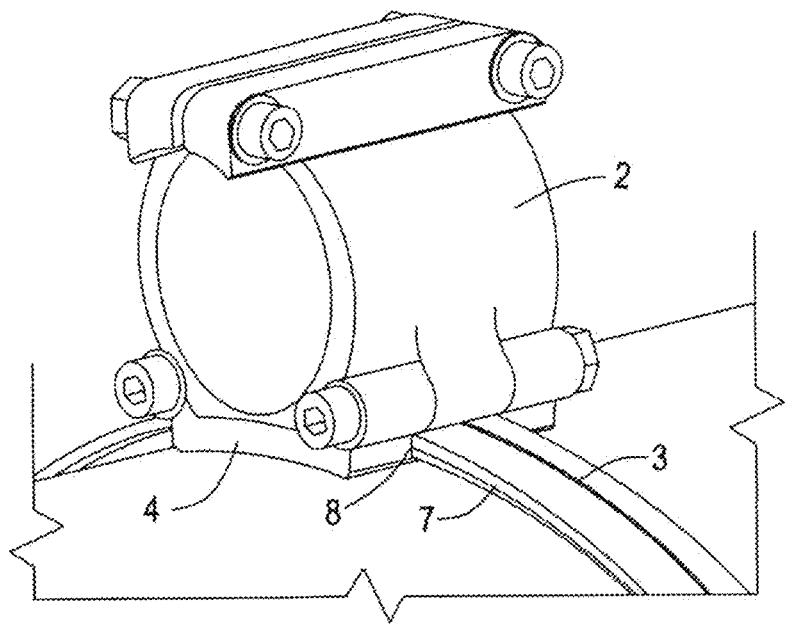
FIG. 4 is a perspective view of an alternative embodiment of the system according to the invention.

An alternative embodiment of the invention is depicted in FIG. 4. The difference between this embodiment and the one described above is in the connection between the sledge and the track element, and the subsequent design of said sledge and track element. Said connection is also in this embodiment made up of ribs 7 and recesses 8, but the ribs are a part of the track element, while the recesses are formed as parts of the sledge.

Figure 5:
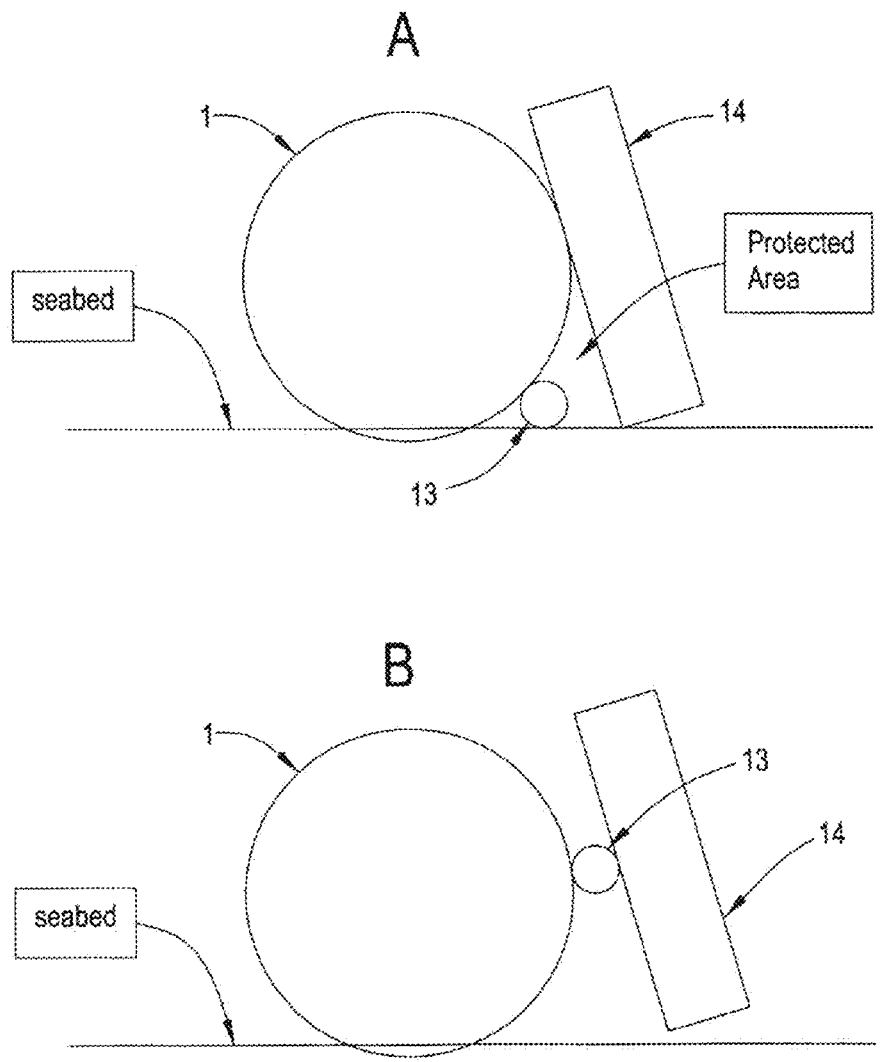
FIG. 5 is a schematic drawing showing an advantage obtained by the present invention.

One advantage of the present system is shown schematically in FIG. 5 A. Due to the free rotation of the sledge 4, and consequently the clamped cable 13, and the gravity forces, the cable 13 will position itself at the seabed close to the pipeline 1 (for example, the cable may be positioned between 5 and 7 o'clock along the circumference of the pipeline) to which it is mounted. In this position the pipeline 1 itself will protect the cable 13 from being exposed to most types of external impacts, such as from a trawl board 14. If the cable was positioned at the side, as shown in FIG. 5 B, the cable would be highly vulnerable to external impacts and additional protection would be required to avoid damage.

In an alternative embodiment, the cable or holding means may be furnished with buoyancy elements which will cause the cable to be positioned at the topside of the pipeline. A topside positioning of the cable, i.e. the cable positioned at 12 o'clock along the circumference of the pipeline, may in some applications be preferred, for instance if the temperature of the cable gets to high when positioned between 5 and 7 o'clock. The damage from a potential impact would also in this case be minimized due to the mobility of the cable.

The invention claimed is:

1. A subsea system for mounting a cable to a pipeline comprising:
    holding means for holding the cable and a track around at least parts of the circumference of the pipeline,
    wherein the holding means includes a sledge element, and the track and the sledge element are slidably connected such that the sledge element is movable along said track,
    wherein the sledge and the track element have cooperating ribs and recesses which hold the sledge in place against the track while allowing it to move along the track element around the pipeline, and
    wherein said ribs are placed inside and in contact with said recesses so as to prevent the sledge element to radially deviate from the track.

2. The system according to claim 1, wherein the connection between the track and the sledge element prevents said sledge element from moving in a radial direction in relation to the pipeline.

3. The system according to claim 2, wherein the connection comprises at least one recess and at least one cooperating rib.

4. The system according to claim 1, wherein the holding means comprises a clamp.

5. The system according to claim 4, wherein at least parts of the clamp is pivotably connected to the sledge element.

6. The system according to claim 1, wherein the connection between the sledge element and the track comprises means for securing the sledge element at a specific position along said track.

7. The system according to claim 1, wherein the sledge element is secured to the track by a belt being arrangeable around the pipeline.

8. The system according to claim 1, wherein the track is an integrated part of the pipeline.

9. The system according to claim 1, wherein the track is a discrete track element.

10. A method for mounting a cable to a pipeline, comprising the steps of:
- arranging a track element around the circumference of the pipeline, or providing a pipeline having a track integrated around the circumference of the pipeline;
- fastening the cable to holding means having a sledge element, the sledge and the track elements having cooperating ribs and recesses which hold the sledge in place against the track while allowing it to move along the track element around the pipeline; and
- slidably connecting the sledge element to the track element, where said ribs are placed inside and in contact with said recesses so as to prevent the sledge element to radially deviate from the track, such that the sledge element is moveable along said track element.

* * * * *